United States Patent
Jones et al.

(10) Patent No.: US 7,498,721 B2
(45) Date of Patent: Mar. 3, 2009

(54) RESONANT SENSOR ASSEMBLY

(75) Inventors: Edward Barry Jones, Middlesex (GB);
Neil M. White, Southampton (GB);
John M. Tudor, Southampton (GB);
Stephen P. Beeby, Southampton (GB)

(73) Assignee: Brunel University (GB)

( * ) Notice: Subject to any disclaimer, the term of this patent is extended or adjusted under 35 U.S.C. 154(b) by 283 days.

(21) Appl. No.: 10/544,755

(22) PCT Filed: Feb. 5, 2004

(86) PCT No.: PCT/GB2004/000455

§ 371 (c)(1), (2), (4) Date: Mar. 27, 2006

(87) PCT Pub. No.: WO2004/070335

PCT Pub. Date: Aug. 19, 2004

(65) Prior Publication Data

US 2006/0170311 A1    Aug. 3, 2006

(30) Foreign Application Priority Data

Feb. 5, 2003 (GB) ................. 0302585.5
Feb. 5, 2003 (GB) ................. 0302586.3

(51) Int. Cl.
*H01L 41/04* (2006.01)
*H01L 41/08* (2006.01)

(52) U.S. Cl. .................................... 310/338
(58) Field of Classification Search ........... 310/320, 310/321, 330–332, 338, 370; 73/514
See application file for complete search history.

(56) References Cited

U.S. PATENT DOCUMENTS 4,594,898 A * 6/1986 Kirman et al. ................. 73/778

(Continued)

FOREIGN PATENT DOCUMENTS

EP 0 486 397 A 5/1992
WO WO 00/20850 A 4/2000

OTHER PUBLICATIONS

Beeby, S.P., et al., "Thick-film PZT-silicon micromechanical resonator" *Electronics Letters*, IEE Stevenage, GB, vol. 36, No. 19, pp. 1661-1662, Sep. 2000, XP006015694, ISSN: 0013-5194.

(Continued)

*Primary Examiner*—Jaydi SanMartin
(74) *Attorney, Agent, or Firm*—Craig A. Fieschko, Esq.; DeWitt Ross & Stevens S.C.

(57) ABSTRACT

A triple beam resonator (10) is provided with three beams or tines (12, 14, 16) aligned in parallel alongside each other and joined at a decoupling zone (18) at each end, which is in turn connected to the surrounding material. The central beam (14) is twice the width of the two outer beams (12, 16). The resonating element has a length of 15.5 mm, a thickness of 0.25 mm and beam widths of 2 mm and 1 mm. The distance between the beams is 0.5 mm. Finite element analysis predicts the modal behavior with stress distribution and eigenfrequencies of the resonator (10). Thick-film PZT elements (20, 22) were printed on separate regions at each end of the central beam (14), where maximum stresses exist as the resonator (10) operates in its favored mode of vibration. The PZT element (20) at one end drives the vibrations, while the PZT element (22) at the other end detects them. Positioning the PZT driving and sensing elements (20,22) on the regions of maximum stresses maximizes the degree of mechanical coupling between the active piezoelectric layer and the resonator for generation of both driving forces and sensing signals. Very high quality factors of 3100 and higher have been experienced. Furthermore, the resonator can be manufactures by batch production techniques while maintaining high reliability and reproducibility.

22 Claims, 19 Drawing Sheets

U.S. PATENT DOCUMENTS

| | | | | |
|---|---|---|---|---|
| 5,020,370 A | * | 6/1991 | Deval et al. | 73/514.29 |
| 5,266,863 A | * | 11/1993 | Nonami et al. | 310/339 |
| 5,367,217 A | * | 11/1994 | Norling | 73/862.59 |
| 6,161,440 A | * | 12/2000 | Hulsing et al. | 73/862.59 |
| 6,435,029 B1 | * | 8/2002 | Hulsing et al. | 73/514.29 |

OTHER PUBLICATIONS

Burns, D.W., et al., "Sealed-cavity resonant microbean pressure sensor" *Sensors and Actuators A*, Elsevier Sequoia, S.A., Lausanne, Switzerland, vol. 48, No. 3, pp. 179-186, May 1995, XP004303602, ISSN: 0924-4247.

Cai, Q.Y., et al., "A wireless, remote query ammonia sensor" *Sensors and Actuators B*, Elsevier Sequoia S.A., Lausanne, Switzerland, vol. 77, No. 3, pp. 614-619, Jul. 2001, XP004250715, ISSN:0925-4005.

Crescini, D., et al., "Thick-film resonant sensor for force measurement on stainless steel substrate" *Proceedings of the Italian Conference Sensors and Microsystems*, pp. 271-275, 1996, XP000865906.

White, N. M., et al., "Excitation of thick-film resonant sensor structures" *IEE Proceedings: Science, Measurement and Technology*, IEE, Stevenage, GB, vol. 142, No. 3, pp. 244-248, May 1995, XP006004417, ISSN: 1350-2344.

Yan, T., et al., "Thick-film PZT-metallic triple beam resonator" *Electronics Letters*, IEE Stevenage, GB, vol. 39, No. 13, pp. 982-983, Jun. 2003, XP006020541, ISSN: 0013-5194.

* cited by examiner

RESONANT SENSOR ASSEMBLY

FIELD OF THE INVENTION

The present invention relates to a resonant sensor assembly.

BACKGROUND OF THE INVENTION

Resonant sensors have been used in a wide range of sensing applications, such as to measure load, pressure, torque and fluid flow characteristics. The key element of these sensors is the resonator, an oscillating structure, which is designed such that its resonance frequency is a function of the measurand.

The most common sensing mechanism is for the resonator to be stressed as a force sensor. The applied stress effectively increases the stiffness of the resonator structure, which results in an increase in the resonator's natural frequency. The resonator provides a virtual digital frequency output, which is less susceptible to electrical noise and independent of the level and degradation of transmitted signals, offering good long-term stability. The frequency output is compatible with digital interfacing, requiring no analogue-to-digital conversion and therefore maintaining inherent high accuracy and low cost.

Resonator sensors often have a relatively high mechanical quality factor (Q-factor), which leads to a high resolution of frequency and hence high sensitivity. A high Q-factor also implies low energy losses from the resonator and therefore low power requirements to maintain the resonance, and better noise rejection outside the resonance frequency bandwidth, which simplifies the operating electronics. Resonant sensors have been made in a wide range of types, sizes and materials as described, for example, by Barthod C, Teisseyre Y, Gehin C and Gautier G in "Resonant force sensor using PLL electronics", Sensors and Actuators A 104 pages 143 to 150 (2003).

Current resonators used for measuring force, pressure and torque make use of resistance- strain gauges. This technology is around 40 years old and the performance of strain gauges is generally limited by fatigue and creep.

The manufacture of resonators using such technology is relatively expensive and labour intensive and therefore difficult to automate. Moreover, the technology has almost reached its limit in terms of performance levels.

SUMMARY OF THE INVENTION

The present invention seeks to provide an improved resonant sensor.

According to an aspect of the present invention there is provided a resonant sensor including a thick-film piezoelectric drive or pickup.

Preferably, the thick-film piezoelectric drive or pickup has a thickness of at least one micrometer, for example between 1 to 2 micrometers. It may have a thickness of between 5 to 20 micrometers or 50 to 100 micrometers or any thickness between these ranges, dependant upon application.

In the preferred embodiment, the thick-film piezoelectric drive or pickup is printed, most preferably screen printed, onto a substrate. The substrate may be a specific component of the resonator or maybe an article or part of an article whose strain, pressure or torque of which is to be measured.

In the preferred embodiment, the resonator sensor is a beam resonator having a thick-film piezoelectric drive or pickup thereon. Most preferably, the beam resonator is a triple beam resonator, although in some embodiments could be provided as a double beam resonator.

Advantageously, both the drive or drives and pickup or pickups of the resonator are formed from thick-film piezoelectric material. Most preferably, the piezoelectric material is printed, advantageously by screen printing.

The advantage of these features of resonator is that the piezoelectric material can be applied by an automated manufacturing process. Moreover, the preferred embodiments of the resonator have a quality factor much higher than prior art resonators, as described below.

Screen printing of the piezoelectric material is a process which is readily automated and which can provide accurate manufacturing conditions and therefore which can provide products of reliable and repeatable quality.

Advantageously, the substrate of the resonator is made of metal or a metallic substance. In an alternative embodiment, the substrate is made from a silicon or ceramic material.

In embodiments where only one of the drive or drives or pickup or pickups is formed of thick-film piezoelectric material, the other of the drive or drives or pickup or pickups can be electrostatic, capacitive or optical.

Advantageously, the piezoelectric material includes lead zirconate titanate (PZT). This material, in particular the versions known as 4 and 5H, have been found to be particularly suitable for this resonator, as described below.

In some embodiments, the resonator is provided with a plurality of drives and pickups.

In the embodiment of triple beam resonator, it is preferred that the beams are substantially parallel to one another, with the central beam having a volume twice that of each of the other beams, for example having a width which is twice the width of the other two beams or thickness which is twice the thickness of the other two beams or any other such dimensional combination. The arrangement is such that, as explained below, the central beam can be made to counter-resonate with respect to its two side beams.

Advantageously, the beam resonator is etched from thin plate metal materials. Particularly advantageous materials have been found to be 430 stainless steel, Inconel and beryllium copper.

In one embodiment, the beams may be provided with symmetrically notched links to a primary sensing metallic structure.

The beam resonator may be provided with stand-off supports to enable the resonator to be located on the surface beams of the resonator spaced from that surface.

In the preferred embodiments, the resonator is provided with wireless communication means for communicating with the drive(s) and/or pickup(s). This may be provided by an amplitude modulated magnetic coupling, by electromagnetic radiation (including microwave and light frequencies) and ultrasound.

In an embodiment, time diversion multiplexing is provided for powering the resonator and for detecting the resonator frequency. Advantageously, in both cases, amplitude modulation of a microwave carrier is used.

In the case of a resonator having a silicon or carbon beam structure, it is preferred that the resonator includes a glass layer. Advantageously, the glass layer is attached to a resonator diaphragm, for example by use of a solder. The diaphragm is preferably a stainless steel diaphragm, for example of 174 pH stainless steel.

According to another aspect of the present invention, there is provided a resonant sensor including wireless communication means to drive and/or read from the sensor. The sensor is preferably a beam sensor.

BRIEF DESCRIPTION OF THE DRAWINGS

Embodiments of the present invention are described below, by way of example only, with reference to the accompanying drawings, in which.

DETAILED DESCRIPTION OF PREFERRED VERSIONS OF THE INVENTION

The preferred embodiments described herein provide a metallic, silicon or ceramic triple-beam resonator with thick-film piezoelectric elements to drive and detect the vibrations. In the case of a metallic resonator, the substrate of the preferred embodiment was fabricated by means of a double-sided photo chemical-etching technique and the thick-film piezoelectric elements were deposited by a standard screen printing process. An embodiment of resonator which was built and tested had a length of 15.5 mm, an overall width of 7 mm and had a favoured mode at 7.2 kHz with a Q-factor of 3100. The triple beam resonator could be described has having a tuning fork structure with thick-film piezoelectric drive and pickup elements.

Figure 1:
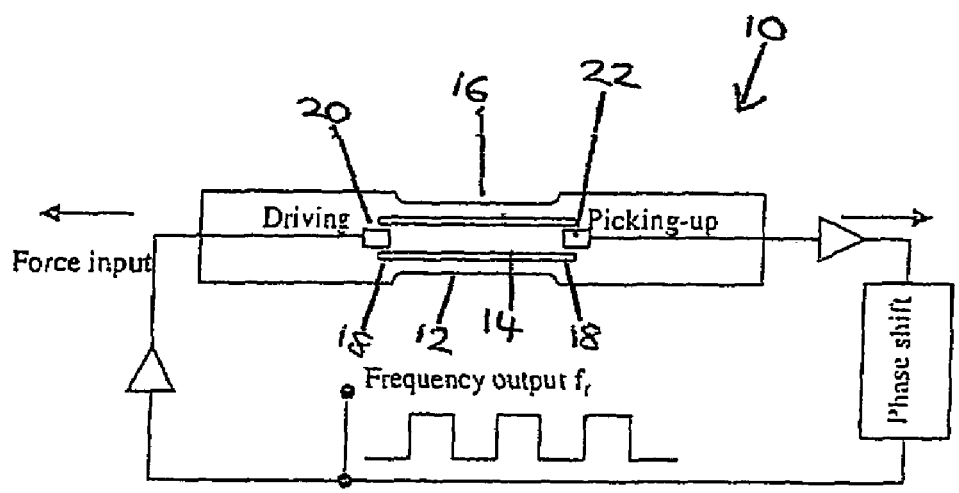
FIG. 1 shows an embodiment of triple beam resonator with printed thick-film piezoelectric drive and pickup.

Referring to FIG. 1, the embodiment of triple beam resonator shown is provided with printed thick-film piezoelectric drives and pickups. Thick piezoelectric films are batch screen printed onto the tines of the resonator at the correct positions to obtain the required resonant vibration mode. The process of standard batch-screen-printing for depositing the piezoelectric materials allows good repeatability and reproducibility for fabrication of the drives and pickups. Each electrode consists of four consecutively thick-film printed layers; dielectric layer at the bottom, bottom metal electrode, piezoelectric layer and top metal electrode. One electrode acts as drive and the other one acts as pickup.

Through amplification and suitable phase shift the pickup signal can be fed back to the drive to maintain the resonator at the required resonance mode. The resonance frequency is a function of the physical quantity to be measured. These characteristics will be apparent to the skilled person.

It is preferred that the resonators are batch photo-chemically etched from thin plate with symmetrical notched links to the surrounding structure. The process of photochemical etching allows high repeatability and reproducibility for fabrication of the resonator substrates.

Figure 2:
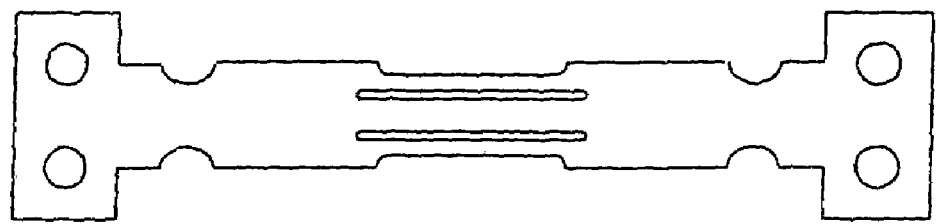
FIG. 2 is a plan view of a triple beam resonator having notched links.
Figure 3A:
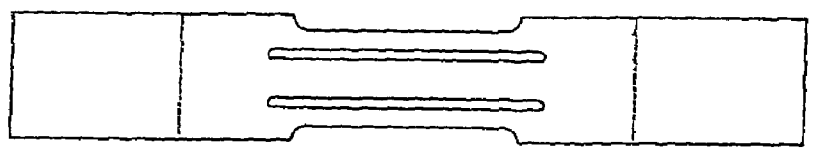
FIGS. 3A and 3B show, respectively, plan view and side elevational views of an embodiment of triple beam resonator with integral stand off supports.
Figure 3B:
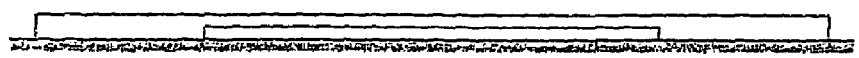

Referring now to FIG. 2, there is shown an embodiment of triple beam resonator having notched links. The notched links help to isolate external structural vibrations coupled to the resonator and therefore improve its performance. FIGS. 3A and 3B show an embodiment of triple beam resonator with integral stand-off supports. The stand-off supports allow the resonator to be mounted to a flat surface with ease and with a precise clamping length. This allows high repeatability and reproducibility of the resonator performance to be obtained.

The resonator structure shown in FIGS. 3A and 3B can be produced by simultaneous double-sided etching using separate masks. This produces different thicknesses for the sensing section (less) and the clamping sections (greater) of the resonator.

Figure 4:
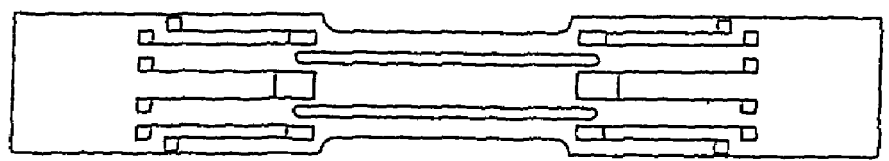
FIG. 4 is a plan view of an embodiment of triple beam resonator with multiple drives and pickups.

FIG. 4 shows an embodiment of triple beam resonator with multiple drives and pickups. This allows different combinations of drive and pickup configuration on the same resonator.

The embodiments shown in FIGS. 1 to 4 have the same basic structure described in detail with reference to the embodiment of FIG. 1.

The resonator 10 consists of three beams (tines) 12, 14, 16 aligned in parallel alongside each other and joined at a decoupling zone 18 at each end, which is in turn connected to the surrounding material. The central beam 14 is twice the width of the two outer beams 12, 16. The resonating element has a length of 15.5 mm, a thickness of 0.25 mm and beam widths of 2 mm and 1 mm. The distance between the beams is 0.5 mm. Finite element analysis (FEA) has been performed to predict the modal behaviour with stress distribution and eigenfrequencies of the resonator 10. Thick-film PZT elements 20, 22 were printed on separate regions at each end of the central beam 14, where maximum stresses exist as the resonator 10 operates in its favoured mode of vibration. The PZT element 20 at one end drives the vibrations, while the PZT element 22 at the other end detects them. Positioning the PZT driving and sensing elements 20, 22 on the regions of maximum stresses maximises the degree of mechanical coupling between the active piezoelectric layer and the resonator for generation of both driving forces and sensing signals.

The triple beam resonator 10 can have three different fundamental modes of vibration out of the plane of the wafer. In mode one, the three tines 12, 16 oscillate in phase. In mode two, the central tine 14 does not oscillate while the outer tines 12, 16 vibrate at a phase of 180° with respect to each other. In mode three, the central tine 14 vibrates in anti-phase with the outer tines 12, 16. This mode is the optimum for operating such a triple beam resonator 10, as both bending moments and shearing forces at the decoupling zone are cancelled out and very little vibration energy is coupled into the supporting frame at each end. This improves the Q factor of the device and therefore the performance of a resonant sensor employing such a device. The in-phase mode has the lowest resonant frequency, followed by the second and the third modes. There are also other higher-order modes of vibrations.

Figure 6:
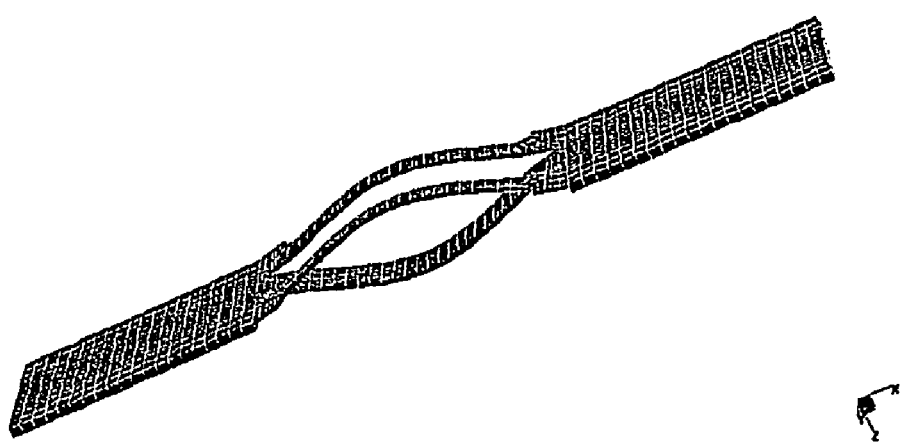
FIG. 6 shows a model displaying the operational behaviour of an embodiment of triple beam resonator, modelled by finite element analysis.

FIG. 6 shows a model of this behaviour. The turning fork was excited into resonance by thick-film printed piezoelectric element 20 at one end of the resonator 10 and the oscillation was sensed by second thick-film printed piezoelectric element 22 at the other end of the resonator both being on the central beam 14. The frequency of the detected vibration forms the sensor output and this signal is fed back to the drive mechanism via amplifiers and phase shift circuits so as to maintain the structure at resonance in the required mode.

The substrate of the resonator 10 was fabricated from a 0.5 mm thick 430S17 stainless steel thin wafer using a simultaneous double-sided photochemical etching technique, with a top pattern to define the layout of the resonator and a bottom pattern to etch in a stand-off distance leaving the section of resonating element 0.25 mm thick. A dielectric layer was then deposited at the defined driving and sensing regions on the top surface of the resonator 10 using a standard screen-printing process, and consecutively layers of bottom gold electrode, piezoelectric paste and top gold electrode, were deposited each with their own screens. The dielectric layer was provided to isolate the bottom electrode from the resonator substrate in order to polarise the piezoelectric layer in a later stage.

The fabricated resonators 10 were sawn from the wafer and electrical connections were made by conventional wire bonding. The PZT elements were then connected in parallel and poled for one hour at 130° C. with a voltage of 200 V across the electrodes. Given the measured PZT layer thickness of 50 μm, an electric field of strength 4 MV/m was generated during the polarising process. This aligns the dipoles within the PZT material enabling it to exhibit its piezoelectric properties.

Figure 5:
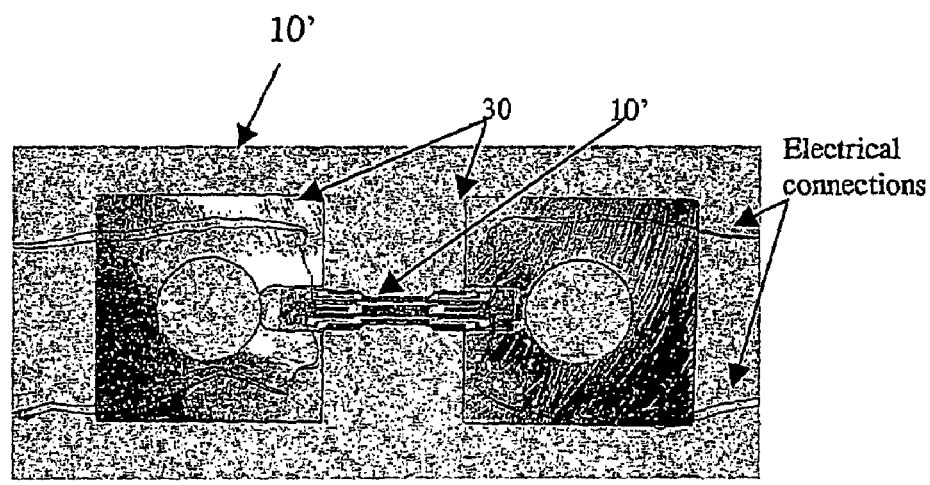
FIG. 5 shows a plan view of a metallic triple beam resonant force sensor.

Referring now to FIG. 5, there is shown a photograph of a metallic resonant force sensor 10 with bonding pads 30 for applying forces. The sensor 10 consists of a suspended, well-balanced, triple beam vibrating structure maintained at resonance by a closed-loop feedback-control electronic circuit. The sensor is designed to oscillate in a differential mode where the central beam vibrates in anti-phase with the outer beams to minimise mechanical energy losses from the resonator. The resonator of this embodiment operates in a similar manner as the model shown in FIG. 6.

Figure 7:
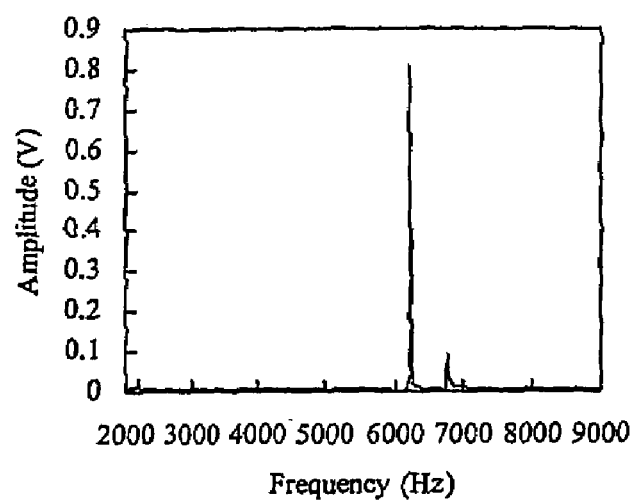
FIG. 7 is a graph showing the frequency response of the preferred embodiment of triple beam resonator.

The resonator 10, 10' operating in air was first tested in an open-loop configuration in order to observe the vibration modes and confirm successful operation of the driving and sensing mechanisms. The PZT element 20 at one end of the resonator was driven by an AC signal of 1V peak-peak from a Hewlett-Packard 89410A Vector Signal Analyser with the tracking generator scanning over a frequency range of 2-9 kHz. The PZT element 22 on the other end of the resonator was connected to a Kistler 5011 Charge Amplifier and the output from the charge amplifier was fed back to the signal analyser for frequency response analysis of the resonator. FIG. 7 shows the frequency response of the resonator 10, 10' with clear resonances at 2.2 kHz, 6.2 kHz and 6.8 kHz. These resonances correspond to the first, the third and the fourth vibration modes of the resonator respectively, according to the FEA predictions, with the third mode of vibration being by far dominant due to the favourable dynamic structure balance associated with this mode. It is clear that the peak corresponding to mode two is not visible, since in this mode the central beam, where the pick-up is located, is at rest.

The Q factor of the resonator 10, 10' in air for mode three was measured to be 3100, which is excellent when compared to a Q-factor 70 of a silicon single beam resonator with PZT thick films operating in air or a Q-factor 400 of a silicon triple beam resonator with thin films vibrating in air or the Q-factors of other metallic resonators in air.

In another test, the resonator in air was pre-tensioned by 15 N from a hanger structure and further loaded an unloaded between 0 N and about 50 N.

Figure 8:
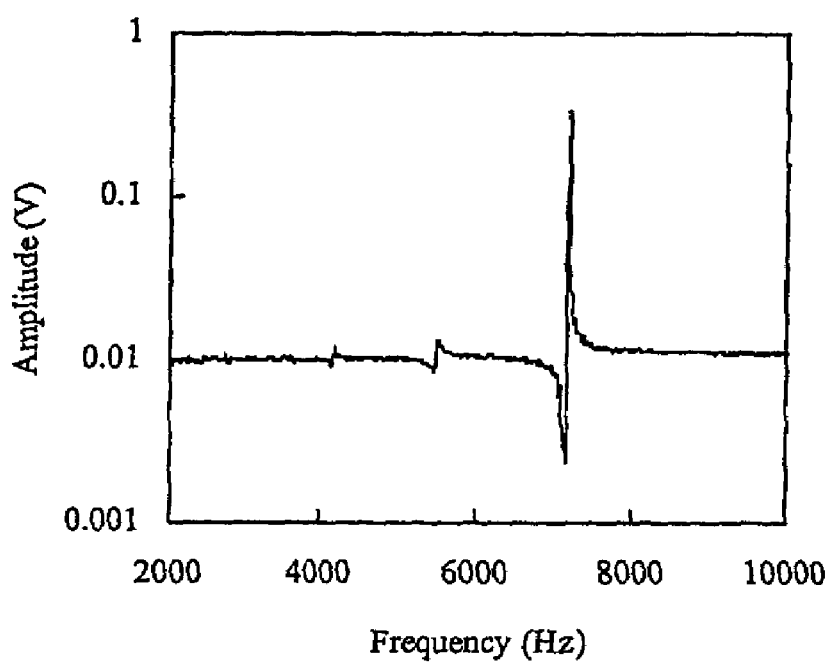
FIG. 8 shows an amplitude-frequency response of the preferred embodiment of resonators.

FIG. 8 shows a typical open-loop frequency response of the resonator over a frequency range of 2-10 kHz under a load of 25 N. A dominant resonance at frequency 7.2 kHz can be seen with two other resonances just visible at frequencies 4.3 kHz and 5.5 kHz. According to finite element analysis predictions, these resonances correspond to the third, the first and the second vibration modes of the resonator respectively. In mode one, the three beams 12-16 vibrate in phase. In mode two, the central beam 14 does not vibrate while the outer beams 12, 16 oscillate at a phase of 180 degrees with respect to each other. In mode three, that is the differential mode, the central beam 14 oscillates in anti-phase with the outer beams 12, 16. The differential mode is far more dominant than the others as this is due to the favourable dynamic structure balance associated with the mode. The Q factor of the experimental resonator at the load of 25 N for the differential mode was measured to be 2180.

Figure 9:
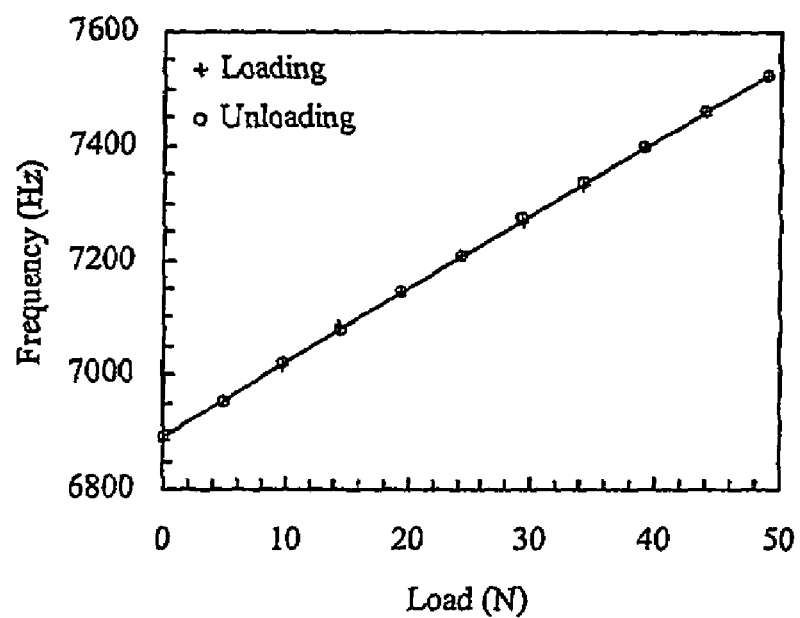
FIG. 9 shows a graph of load response of an embodiment force sensor.

FIG. 9 shows the response of the resonator 10, 10' to variable load and Table 1 summarises the typical characteristics of the sensor, the sensor has a sensitivity of 13.0 Hz/N.

The use of better spring materials such as 17-4H stainless steel and beryllium copper to etch the tuning fork can also improve the general performance of the sensor. Printing of thick film piezoelectric elements onto these materials to fabricate the resonators and employing of suitable structural mechanisms with appropriate clamping methods to embed the resonators for load cells, weighing machines and torque sensors is also contemplated.

TABLE 1

Characteristics of the force sensor.

| Parameter | Value | | As % of span (0-49 N) |
|---|---|---|---|
| Natural frequency at zero load | 6890 | Hz | |
| Mechanical Q | >1460* | | |
| Frequency shift | 635 | Hz | |
| Sensitivity | 13.0 | Hz/N | |
| Max Hysteresis | 2 | Hz | 0.3 |
| Repeatability | 5 | Hz | 0.8 |
| Max non-linearity | 2.5 | Hz | 0.4 |
| Stability (over 30 minutes) | | | |
| zero load | 0.4 | Hz | 0.07 |
| half load | 0.4 | Hz | 0.07 |
| full load | 0.5 | Hz | 0.07 |

*lowest Q-factor over the applied load range.

Figure 10:
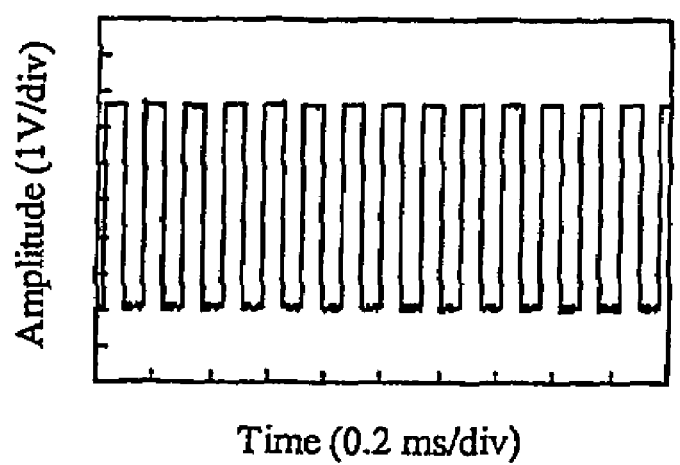
FIG. 10 shows the digital frequency output from an embodiment of sensor in closed-loop arrangement.

A feedback-control electronic circuit has also been designed to operate the sensor 10, 10' in a closed-loop configuration. The system comprises a PZT sensing element, a charge amplifier circuit, followed by a digital 90-degree phase shift circuit and a second stage amplification circuit all fabricated on a single circuit board. The output from the second stage amplification was fed back to the other PZT element for driving the vibrations. In such a way, the resonator was maintained at resonance in the required differential mode of vibration. FIG. 10 shows the digital frequency output from the sensor under a load of 25 N in such a closed-loop configuration, which is easy to be interfaced to sensing instrumentation.

The specific design of a suitable electronic circuit would be immediately apparent to the person skilled in the art having regard for the teachings herein.

It is envisaged in the preferred embodiments that the sensor 10, 10' could be designed to operate in a wireless mode using, for example, various combinations of amplitude modulate magnetic coupling, electromagnetic radiation (including microwave and light frequencies) and ultrasound.

Figure 11:
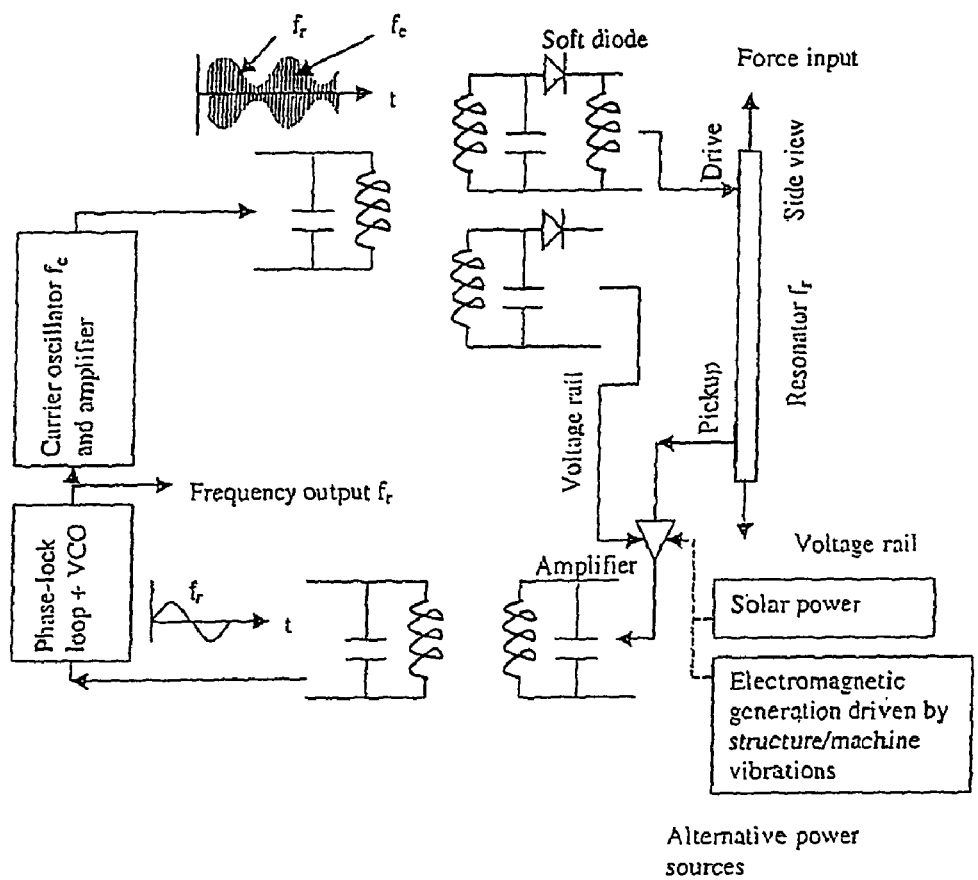
FIG. 11 is a schematic diagram showing an embodiment of magnetic coupling with a sensor having a piezoelectric drive and pickup.

FIG. 11 shows in block diagram form an embodiment of drive and pickup system which uses magnetic field coupling to excite and detect resonance of the resonator through the thick piezoelectric films. In this example, frequency Fc is approximately 9 MHz, while frequency $F_r$ would be in the region of 6 kHz.

Figure 12:
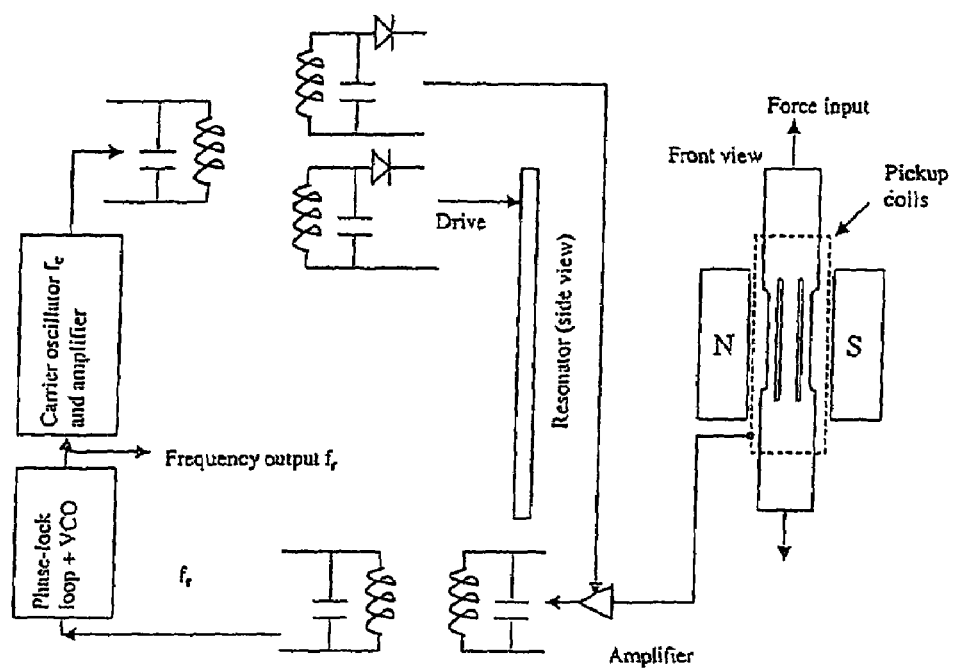
FIG. 12 shows another embodiment of magnetic field couplings with piezoelectric drive and electromagnetic pickup.

FIG. 12 shows an embodiment which uses the combination of a magnetic coupling drive and an electromagnetic pick up.

Figure 13:
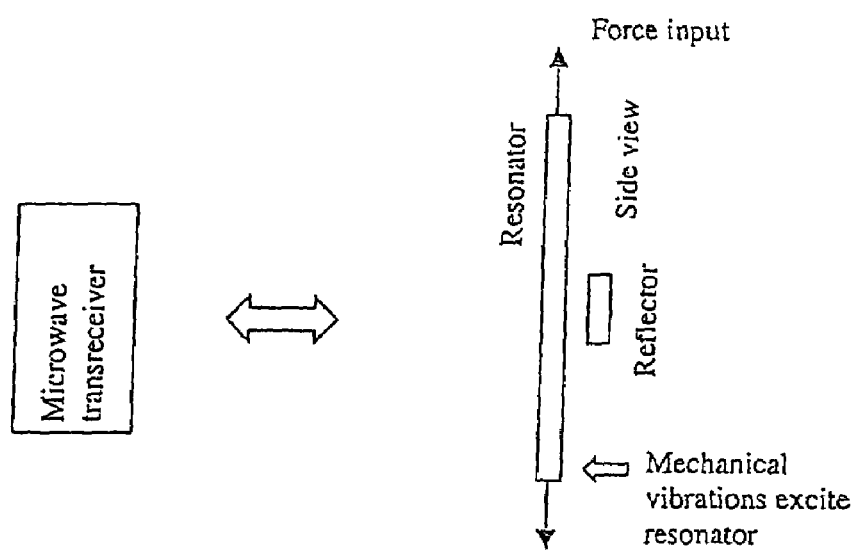
FIG. 13 shows in schematic form a microwave transceiver using a microwave amplitude modulation pickup link.

FIG. 13 shows an embodiment in which the resonator 10, 10' is driven by use of external structural/machine vibrations and pickup is achieved using microwave or light or ultrasound links. In this embodiment, frequency $F_m$ would be in the range of around 10 to around 100 gHz.

Figure 14:
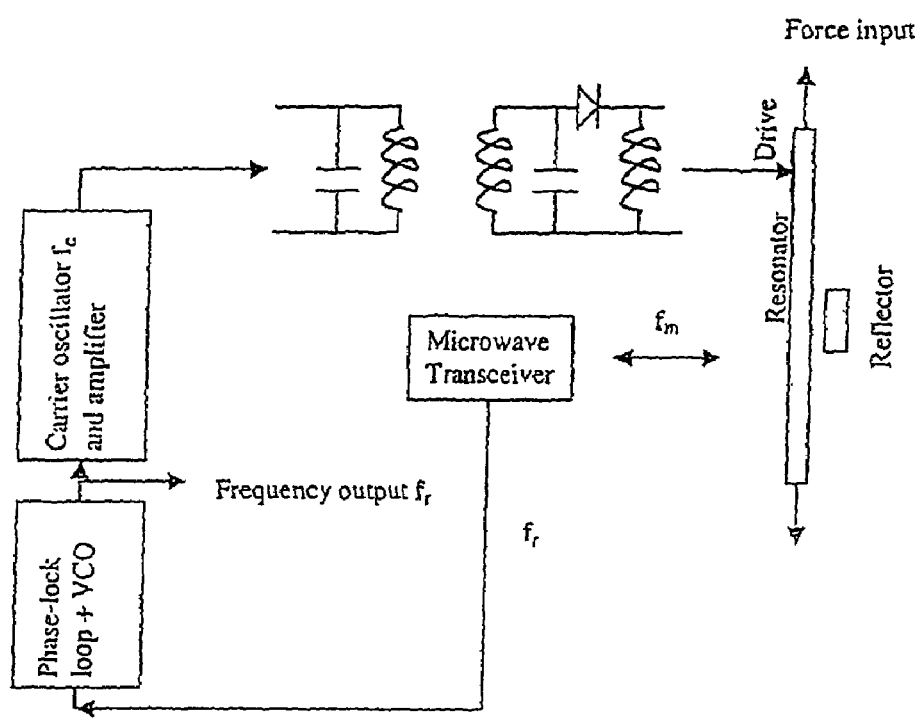
FIG. 14 shows an embodiment of magnetic field coupling and piezoelectric drive and with a microwave amplitude modulation pickup.

FIG. 14 shows an embodiment which uses the combination of a magnetic coupling drive and a microwave amplitude modulation pickup. In this embodiment, frequency Fc is in the region of 9 MHz. Frequency $F_m$ is in the region of gHz, while frequency $F_r$ is in the region of 6 kHz.

Figure 15:
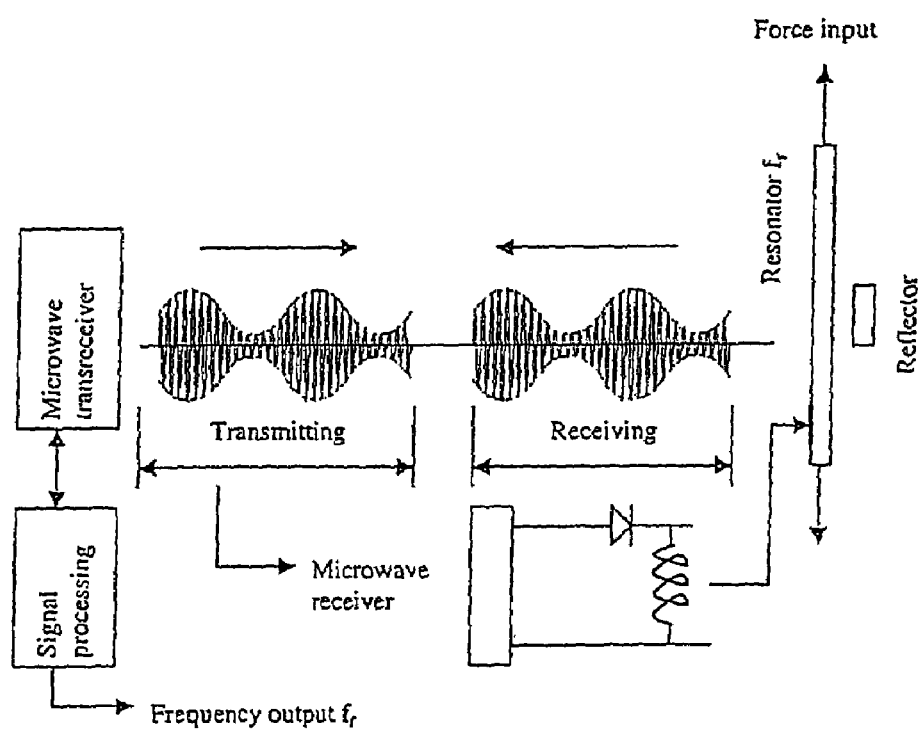
FIG. 15 shows an embodiment with a single microwave link for drive and pickup using time diversion multiplex.

FIG. 15 shows an embodiment in which the resonator is driven by microwave radiation through the piezoelectric thick-film and can also be detected by microwave amplitude modulation reflections with the microwave transceiver. In this case, time diversion multiplex is used both to power the piezoelectric drive on the metallic triple beam resonator 10, 10' at the resonator frequency and also to detect the resonator frequency, in both cases using amplitude modulation of the microwave carrier.

Figure 16:
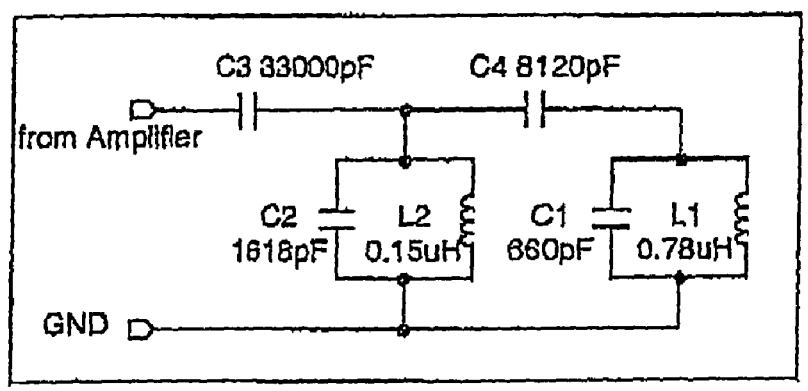
FIG. 16 shows an embodiment with radio frequency links for drive and pickup of the resonator.

FIG. 16 shows in block diagram form an embodiment of radio frequency links for the drive(s) and pick-up(s) of the resonator. In this embodiment, $f_m$ is in the region of 433 MHz, 868 MHz and 2.4 GHz, while $f_r$ is in the region of 6 kHz. An advantage of this embodiment is that it can make use of low power electronics.

Figure 17:
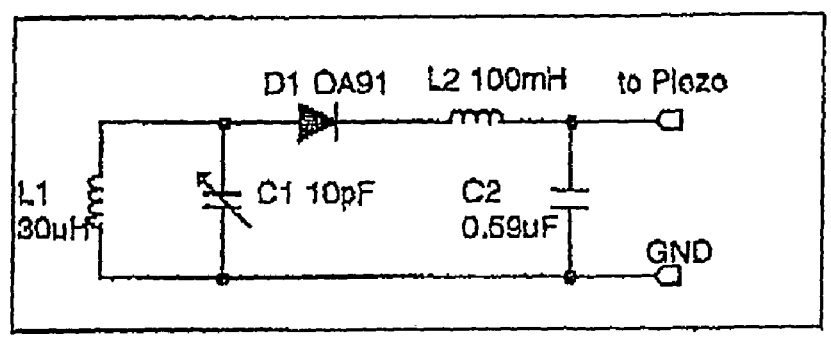
FIG. 17 shows an embodiment of receiver circuits.

FIG. 17 shows an embodiment of a simple reciever circuit for the sensor using magnetic fields. This simple circuit does not have a particularly high Q at 9 MHz but it can recieve the signal between 7 MHz to 10 MHz efficiently. The capacitor and inductor pair C2-L2 sets the lower frequency 7 MHz, while the capacitor pair C1-L1 sets the higher frequency of 10 MHz. The operation of this simple circuit will be readily apparent to the person skilled in the art. In this case, the inductor L1 and the capacitor C1 are tuned to 9 MHz, while the inductor and capacitor pair L2-C2 are tuned to 7 kHz. The diode D1 used is a germanium diode. Circuit works as an amplitude demodulator.

Figure 18:
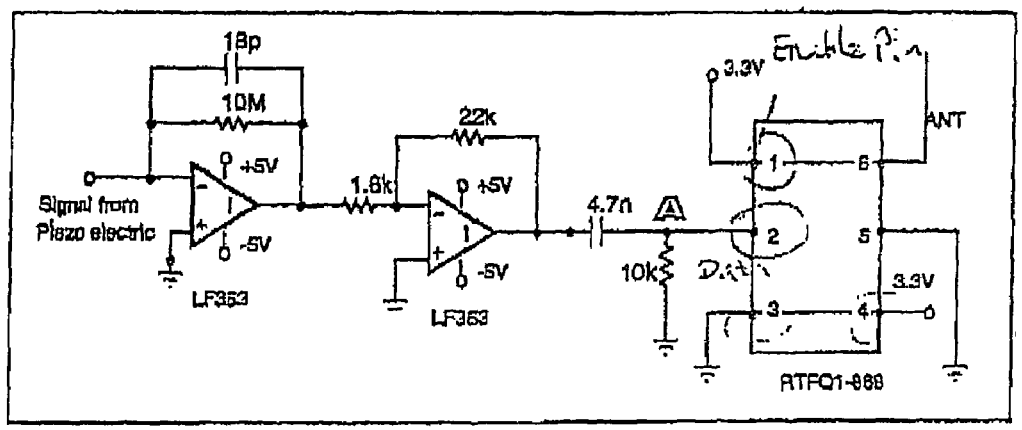
FIG. 18 shows an embodiment of transmitter circuits.
Figure 19:
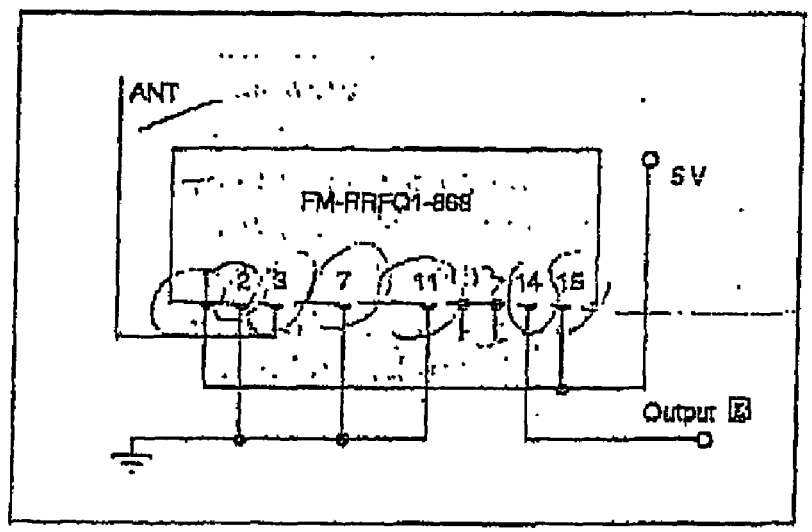
FIG. 19 shows an example of a receiver circuit.

FIG. 18 shows an embodiment of a simple transmitter circuit which can be provided on the sensor module, for use with the reciever circuit shown in FIG. 19.

FIG. 19 shows an embodiment of a simple receiver circuit using a simple FM radio link. During testing, it was found that these circuits provide a usable and efficient wireless coupling between the sensor module and a driving/pickup module.

The sensor and assemblies disclosed herein provide a direct alternative to existing resistance strain gauges and to resonant strain gauges providing frequency outputs. The systems disclosed herein are compatible with digital microelectronics and have many potential applications not available to conventional resistance strain gauges. Moreover, they have significantly improved safety margins and far lower power consumption. Moreover, they provide higher resolution than existing strain gauges, higher stability and repeatability with long term calibration stability. Moreover, the sensors are shock resistant and free from electromagnetic interference. They can therefore be used as a direct replacement for a conventional strain gauges.

As explained above, the sensors can be made reliably by mass manufacturing techniques.

It is preferred that the embodiments of resonator which use a silicone substrate use single crystal silicone. This provides excellent mechanical properties (as strong as steel, as light as aluminium and harder than iron) and are elastic to fracture (showing no discernible creep or fatigue failure). They are also suitable in a wide variety of micro-machining processes, which enable precisely controlled structures to be machined at a very high tolerances.

It is envisaged that the silicon substrate resonators would be provided in a sealed package. However, other embodiments can be used in the same way as conventional strain gauges.

The invention claimed is:

1. A resonant sensor operable to provide a variable resonant frequency dependent upon an amount by which the sensor is stressed, including a triple beam resonator element having a metal or metallic substrate and a thick-film piezoelectric drive or pickup thereon.

2. The sensor of claim 1 wherein the thick-film piezoelectric drive or pickup has a thickness of at least one micrometer.

3. The sensor of claim 1 wherein the thick-film piezoelectric drive or pickup has a thickness of between 1 to 2 micrometers.

4. The sensor of claim 1 wherein the thick-film piezoelectric drive or pickup has a thickness of between 5 to 20 micrometers or of between 50 to 100 micrometers.

5. The sensor of claim 1 wherein the thick-film piezoelectric drive or pickup is printed onto a substrate.

6. The sensor of claim 1 wherein the substrate is an article or part of an article the strain, pressure or torque of which is to be measured.

7. The sensor of claim 1 wherein the beams are substantially parallel to one another.

8. The sensor of claim 7 wherein the central beam has a volume twice that of each of the other beams.

9. The sensor of claim 7 wherein the central beam has a width twice that of each of the other beams.

10. The sensor of claim 1 wherein the beams are provided with symmetrically notched links to a primary sensing metallic structure.

11. The sensor of claim 1 wherein both the drive or drives and pickup or pickups of the resonator are formed from thick-film piezoelectric material.

12. The sensor of claim 1 wherein the beam resonator is etched from thin plate metal materials including at least one of: 430 stainless steel, Inconel and beryllium copper.

13. The sensor of claim 1 wherein:
   a. only one of the drive or drives or of the pickup or pickups is formed of thick-film piezoelectric material, and
   b. the other of the drive or drives or of the pickup or pickups is electrostatic, capacitive or optical.

14. The sensor of claim 1 wherein the piezoelectric material includes lead zirconate titanate (PZT).

15. The sensor of claim 1 wherein the resonator is provided with a plurality of drives and pickups.

16. The sensor of claim 1 wherein the resonator is provided with stand-off supports.

17. The sensor of claim 1 wherein the resonator is provided with wireless communication means for communicating with the drive(s) and/or pickup(s).

18. The sensor of claim 1 wherein the communication means is provided by at least one of an amplitude modulated magnetic coupling, electromagnetic radiation (including microwave and light frequencies), and ultrasound.

19. The sensor of claim 1 wherein time diversion multiplexing is provided for powering the resonator and for detecting the resonator frequency.

20. The sensor of claim 1 wherein the substrate is a bulk substrate, with the piezoelectric drive or pickup being printed thereon with a thickness far smaller than the thickness of the substrate.

21. The sensor of claim 1 wherein the thickness of the substrate is greater than or equal to 2.5 times the thickness of the piezoelectric drive or pickup.

22. The sensor of claim 1 wherein the resonator comprises, at each end of the triple beam structure, a symmetrically notched link, whereby the symmetrically notched link may assist in isolating external structural vibrations coupled to the resonant sensor.

* * * * *